United States Patent [19]

Florence

[11] Patent Number: 5,757,411
[45] Date of Patent: May 26, 1998

[54] METHOD AND APPARATUS FOR AMELIORATING THE EFFECTS OF MISALIGNMENT BETWEEN TWO OR MORE ARRAYS OF IMAGING ELEMENTS

[75] Inventor: James M. Florence, Richardson, Tex.

[73] Assignee: Texas Instruments Incorporated, Dallas, Tex.

[21] Appl. No.: 483,782

[22] Filed: Jun. 7, 1995

Related U.S. Application Data

[62] Division of Ser. No. 333,187, Nov. 2, 1994, abandoned.

[51] Int. Cl.$^6$ ........................................... B41J 2/47
[52] U.S. Cl. ........................................... 347/245
[58] Field of Search ........................... 347/238, 239, 347/236, 245

[56] References Cited

U.S. PATENT DOCUMENTS 4,951,064  8/1990  Kun et al. ........................ 347/238
5,006,704  4/1991  Mochizuki et al. .................. 347/236

*Primary Examiner*—Mark Reinhart
*Attorney, Agent, or Firm*—Charles A. Brill; James C. Kesterson; Richard L. Donaldson

[57] ABSTRACT

The present invention provides a method of ameliorating the effects of misalignment between modulator arrays, and a system using the same. The individual arrays are positioned such that a portion of the image produced by the arrays is generated by both arrays. The contribution to the combined output made by each array varies across the overlapped region, with each array making a small contribution to the pixels in the overlapped region at one end and a large contribution to pixels in the overlapped region at the other end. Because the overlapping portions of the modulator arrays collectively form a portion of the image, any alignment error is effectively spread over the entire overlapped region and is much less noticeable.

12 Claims, 13 Drawing Sheets

METHOD AND APPARATUS FOR AMELIORATING THE EFFECTS OF MISALIGNMENT BETWEEN TWO OR MORE ARRAYS OF IMAGING ELEMENTS

This is a divisional of application Ser. No. 08/333,187, filed Nov. 02, 1994 abandoned.

TECHNICAL FIELD OF THE INVENTION

This invention relates to the alignment of image display devices and more particularly to the amelioration of artifacts caused by the misalignment of imaging devices, including spatial light modulator, used in printing and display systems.

BACKGROUND OF THE INVENTION

Many types of imaging devices are used to print or display text and images. The desired characteristics of imaging devices typically include high resolution, high display speed, and freedom from image distortion. Imaging devices typically include an array of elements which together output an image. Each operational cycle of the imaging device is called a device cycle. Each image is typically represented as a two-dimensional array of picture elements, or pixels, called a pixel grid. Each pixel represents the smallest independent picture element that may be produced by an imaging device. Each pixel may be produced by a single imaging device cycle, for example a single LED element that outputs a pulse of variable intensity light to illuminate a pixel, or the pixel may be produced by multiple imaging device cycles, for example an LED element that outputs a series of light pulses which act in cooperation to illuminate a pixel. Although each pixel is typically related to a single element, some systems use the output from multiple modulator elements to display one pixel. An imaging device element may be an individual LED, an LCD cell, an ink-jet, a digital micromirror device (DMD), a thermal printer head, or an electron gun, or any other device capable of producing an image.

Complete images may be produced in three ways. Sequential scanning as employed in CRTs and laser printers, requires only one element which sequentially scans the image pixels in a line, one line at a time until the entire image has been scanned. A second method, used by line printers and some image displays, requires at least one element for each image pixel in a line. The elements display all of the pixels in a line simultaneously and sequentially display each line of the image. The third method, used by frame-addressed imaging devices, uses an array of pixels simultaneously to display an entire image "frame." Frame addressed imaging devices require at least as many elements as the number of image pixels.

High resolution printers require a large number of image pixels to be printed on each line. For example, an electrostatic printer capable of printing 300 pixels or dots per inch (DPI), must print 2550 pixels across one line on 8.5 inch paper. If the image is printed a line at a time, the imaging device used in the printer must have at least 2550 elements. As the number of imaging devices elements increases, so does the complexity and size of the imaging devices required to generate the image.

The torsion beam digital micromirror device (DMD) SLM, as taught in commonly assigned U.S. Pat. No. 5,061, 049, may be used to modulate light in an electrostatic printer. DMDs are manufactured using semiconductor processing techniques and may be fabricated with one million or more mirror elements on a single DMD. However, a DMD with 2550 mirrors in a single row is a large device by semiconductor standards and presents many fabrication challenges. If each pixel of the DMD is 34 μm wide, a row of 2550 pixels is about 3.4 inches long and the die for each device may be approximately 3.5 inches long. This large die size can result in a low wafer utilization. For example, it the 3.5 inch long DMD in the above example is 0.25 inches wide, only 42 DMDs could be manufactured from an eight inch diameter wafer. This would result in a wafer utilization of approximately 73%.

Furthermore, the yield of good DMDs will be low because the large number of mechanical and electrical structures fabricated on each DMD increases the probability of there being at least one defective structure on the DMD. This is partially due to the fact that for a given surface contamination rate, an increase in size of each DMD will increase the probability of a surface contaminant being located on the device. For example, if the probability of a defect in a given structure is 1%, then the probability of producing a defect-free device that includes ten of the structures is about 90%, while the probability of producing a defect-free device that includes 1000 of the structures is about 0.0043%. Because the same process steps, and approximately the same amount of raw materials are used regardless of the number of DMDs formed on a wafer, the cost of processing a wafer is practically independent of the number of DMDs formed on the wafer. Therefore, the low yield and low wafer utilization that occur when large DMDs are manufactured result in a dramatic increase in the cost of good DMDs.

In order to reduce the cost and complexity of the imaging devices used in image displays, several discrete imaging devices have been used, each displaying only a portion of the entire image. For example, four DMDs, each with 2,400 elements, are used in place of the 9,600 element DMD in the above example. While this reduces the size of each DMD to about 1.6 inches, and increases both the wafer utilization and device yield, using multiple imaging devices introduces the possibility of misaligned modulators. If the modulators are not correctly aligned, the resultant image may be distorted, appearing to have features that are not part of the desired image. For example, areas of the image may appear brighter or darker than desired. These image defects are called "artifacts" because they represent an artificial feature caused by the method of image creation instead of a true feature of the desired image.

The effect of artifacts caused by misalignment is increased where one row of elements sequentially produces image pixels line-by-line. This is because misalignment-caused artifacts are duplicated on each line, creating a strong vertical or horizontal feature which is easily perceived by the human eye. Precisely aligning multiple imaging devices during assembly of the image display eliminates alignment artifacts but typically requires the use of precision machined surfaces acting as positional references or complex alignment routines. These methods can be expensive to implement and may result in an unacceptably high rework or rejection rate. Thus, there is a need for an imaging device and a method of alignment, that are capable of tolerating some misalignment without the image being deleteriously affected by artifacts.

SUMMARY OF THE INVENTION

The present invention provides a method of ameliorating the effects of misalignment between imaging devices, and a system using the same. The ability to reduce the effects of misalignment allows multiple, smaller more cost effective arrays to be used instead of one large array. This can reduce the manufacturing costs of the array, especially arrays that are produced using semiconductor manufacturing processes such as the digital micromirror device.

One embodiment of a method of ameliorating the effects of misalignment between two or more imaging devices each capable of generating an output over a region, according to the present invention comprising overlapping a portion of the output region from each imaging devices with a portion of the output region of at least one other imaging devices and reducing the output from each imaging device in the overlapped portion of the output region such that the total output in the overlapped portion from all imaging devices is a desired value.

A second embodiment, according to the present invention, of a method of ameliorating the effects of misalignment between adjacent imaging device-generated pixels residing in a selected region, each pixel having a selected respective value, misalignment constituting other than a selected spacing between the adjacent pixels, the method comprises generating plural pixel groups, overlapping the pixel groups within the region so that the displayed pixels include overlapped pixels from different groups, and adjusting the value of the overlapped pixels so that the value of each resulting displayed pixel is the selected respective value.

A display system according to one embodiment of the present invention comprises at least two imaging devices, each imaging device being capable of generating an output which is dispersed over a region, a means for relatively positioning the imaging devices so that at least a portion of the output region from each imaging device overlaps with each imaging device contributing to the output to the overlapped portion, and a means for adjusting the intensity of the output from each modulator so that the output level in the overlapped portion is equivalent to the output level outside the overlapped portion.

A second embodiment of a display system for selectively directing an output of predetermined intensity onto a region comprises two imaging devices, a means for relatively positioning the imaging devices so that the respective outputs thereof partially overlap, and a means for adjusting the intensity of each imaging device to a non-zero value so that the cumulative intensity of the overlapped outputs is substantially equal to the predetermined intensity.

To avoid visual artifacts caused by the misalignment of two or more imaging devices, the individual arrays are overlapped and the portion of the image is generated by both arrays. The contribution to the combined output by the overlapping arrays varies, with each array making a small contribution to the overlapped area at one end and a large contribution at the other end of the overlapped area. Because the overlapping portions of the imaging devices collectively form a portion of the image, the alignment error is effectively spread over the entire overlapping portion and is much less noticeable.

DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

As noted earlier one disadvantage of prior art techniques which involve using more than one modulator to produce a row of pixels is the need to precisely align the imaging devices relative to each other. Because predominately vertical and horizontal features are easily detected by the human eye, a small misalignment between imaging devices may result in a very noticeable visual artifact. The present invention uses multiple imaging devices to produce an image wherein each modulator produces a portion of the image. These portions of the image are overlapped so that at least two imaging devices contribute to the overlapped portion of the image. This allows any misalignment error to be distributed over the overlapped portion of the displayed image, thereby making the error less noticeable to the viewer.

The present invention is applicable to a wide variety of systems and image display technologies. Any system that creates an image by using two or more imaging devices, each of which forms a portion of the image, may use certain embodiments of this invention. The image formed could be either a binary image, one in which there are only two possible pixel intensities, or gray-scale image having multiple pixel intensities. For example, displays that use multiple pulses of light, or a single pulse of a variable length, to create gray-scale or binary images, or printers that use multiple droplets of ink to create an ink dot are candidates for implementation of this invention. It is not important whether the image is ephemeral, as in a video display, or permanent, as in printed page.

The first embodiment of the present invention discussed is a page printer. The page printer is described as implementing a xerographic or electrostatic print process, but other processes such as thermal, impact, ink-jet, or photographic print processes may be used. The present invention uses two imaging devices to cooperatively form at least some of the image dots. Therefore, a thermal printer that either uses multiple pulses to build up a dot, or is capable of outputting pulses of various intensities, may implement the principles of this invention by using the combined output of two imaging devices to create an image dot.

Figure 1:
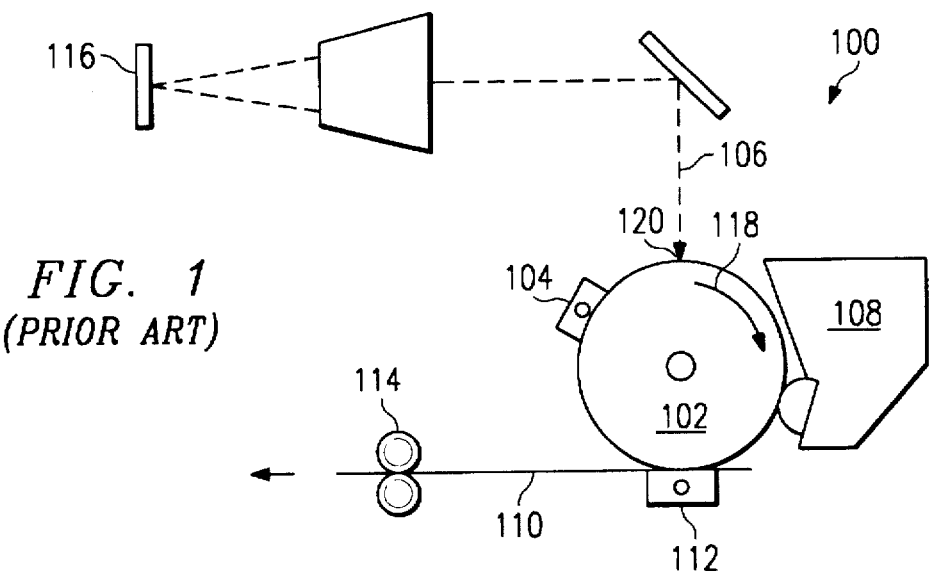
FIG. 1 is a schematic representation of a prior art electrostatic printer.

An electrostatic printer 100, shown schematically in FIG. 1, typically includes a rotating photosensitive drum 102, the surface of which is charged by a main corona unit 104 as the surface of the drum 102 moves past the corona unit 104. The surface of photosensitive drum 102 is made from a material which is normally an electrical insulator but becomes electrically conductive when exposed to light. In the absence of light, the surface of the drum 102 is electrically insulative, causing the charge from the main corona unit 104 to be held on the insulative surface of the drum 102 and preventing the charge from moving about on the insulative surface of the drum 102. To create a latent image, portions of the drum 102 are selectively exposed to light 106 causing those portions to become electrically conductive, thereby allowing the charge on such portions to drain from the exposed surface to the body of the drum 102. The quantity of charge allowed to drain from the exposed portions, and therefore the remaining charge, depends on the intensity and duration of the exposure. Portions of the drum 102 which are not exposed to light but are adjacent to the exposed regions are not affected by the exposure and maintain their charge.

Typically the photosensitive surface of the drum 102 is exposed one line at a time as the surface passes an image point 120 at which point the light 106 is selectively incident on the drum 102. The exposed drum surface then rotates past a toner supply 108 from which small particles of toner, or ink, are electrostatically attracted to the portions of the drum 102 that are still charged. The amount of toner attracted to a given portion of the drum 102 depends on the magnitude of the charge remaining on that portion of the drum 102. The toner attracted to the drum 102 develops the latent image on the drum 102 produced by the exposure to light, and is carried from the toner supply 108 on the surface of the drum 102. When the toner on the surface of the rotating drum 102 reaches a transfer corona unit 112, it is electrostatically transferred to a sheet of paper 110 and carried on the paper 110 to a fuser 114 which melts the toner, causing it to fuse to the paper 110 thereby forming a permanent image on the paper 110. The greater the remaining charge on a portion of the drum 102, the more toner adheres to that portion of the drum 102 and the darker the image formed on the paper 110 by the fused toner.

Because the drum 102 is being rotated past the image point 120 where the light 106 is incident on the drum 102 an imaging device 116 having one row of elements (not shown) may expose an entire image one line at a time. There are several reasons for exposing the drum 102 one line at a time. These reasons include the following: the entire image would be difficult to simultaneously bring into focus on the curved surface of the drum 102; the imaging device 116 used to create a complete image would require many more elements than an imaging device 116 used to image only one line; a smaller light source may be used with a line-at-a-time imaging device; and imaging only one line at a time permits the drum 102 to have a relatively small diameter, which, in turn permits the main corona unit 104 and toner supply 108 to be closer together, reducing the size of the printer 100.

Although the output of the printer 100 is a printed piece of paper, the imaging device 116 is used to create a latent image on the printer drum 102. Furthermore, because the light 106 is used to selectively discharge portions of the drum 102 where toner is not desired, the image used to expose the drum 102 is the negative of the image printed on the paper 110. Because this embodiment of the invention deals with the alignment of the imaging device 116 used to image the printer drum 102, the paper 110 output will not be further discussed, and the image projected onto the drum 102 will be referred to as the display.

Two terms are commonly used to denote directional relationships in an electrostatic printer 100. The first term, "process direction," is used to describe the direction 118 of the drum 102 rotation. As the drum 102 rotates in the process direction 118, each portion of the drum 102 passes beneath the main corona unit 104, the image point 120, the toner supply 108, and the transfer corona unit 112. The second term, scan "direction," defines a direction which is perpendicular to the process direction across the surface of the drum, or perpendicular to the plane of FIG. 1. The term scan direction is derived from applications such as laser printers that sweep, or scan, a beam of light across a line of pixels as the drum 102 is rotating.

Figure 2:
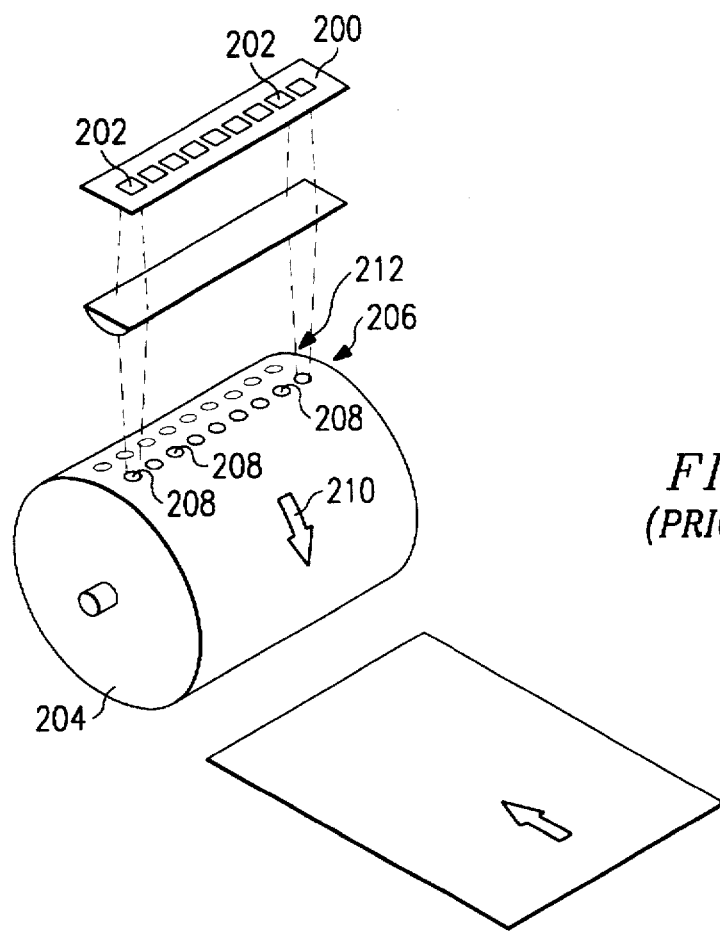
FIG. 2 is a pictorial view of a prior art imaging device array illuminating an electrostatic printer drum.

There are several types of light sources which may be used to expose the drum 102. Because the intensity of the light 106 impinging on the drum 102 must be modulated to create an image, it is desirable to use a variable light source when the source is used to image one pixel at a time. Some light sources such as lasers and light emitting diodes (LEDs) are capable of rapidly varying the output light beam intensity, thereby eliminating the need for a separate modulator. Other light sources including arc and filament lamps cannot be modulated easily and therefore require a light imaging device. In a simple example, shown pictorially in FIG. 2, a linear array 200 of LED elements 202 serves as both a light source and a light modulator to selectively expose a drum 204. The light from each LED 202 in the linear array 200 is focused onto one pixel 208 on the drum. Thus, the LED array 200 simultaneously exposes one row of pixels 206 on the drum 204. The intensity of each LED 202 is adjusted to control the exposure level of each pixel 208. After exposing one row of pixels on the drum, the LED array 200 is turned off while the drum 204 Is rotated in the process direction 210. After the drum 204 has rotated a sufficient amount, a subsequent row of pixels 212 is exposed. This process continues row-by-row until the drum 204 has been exposed to light representing every row of the data.

Figure 3:
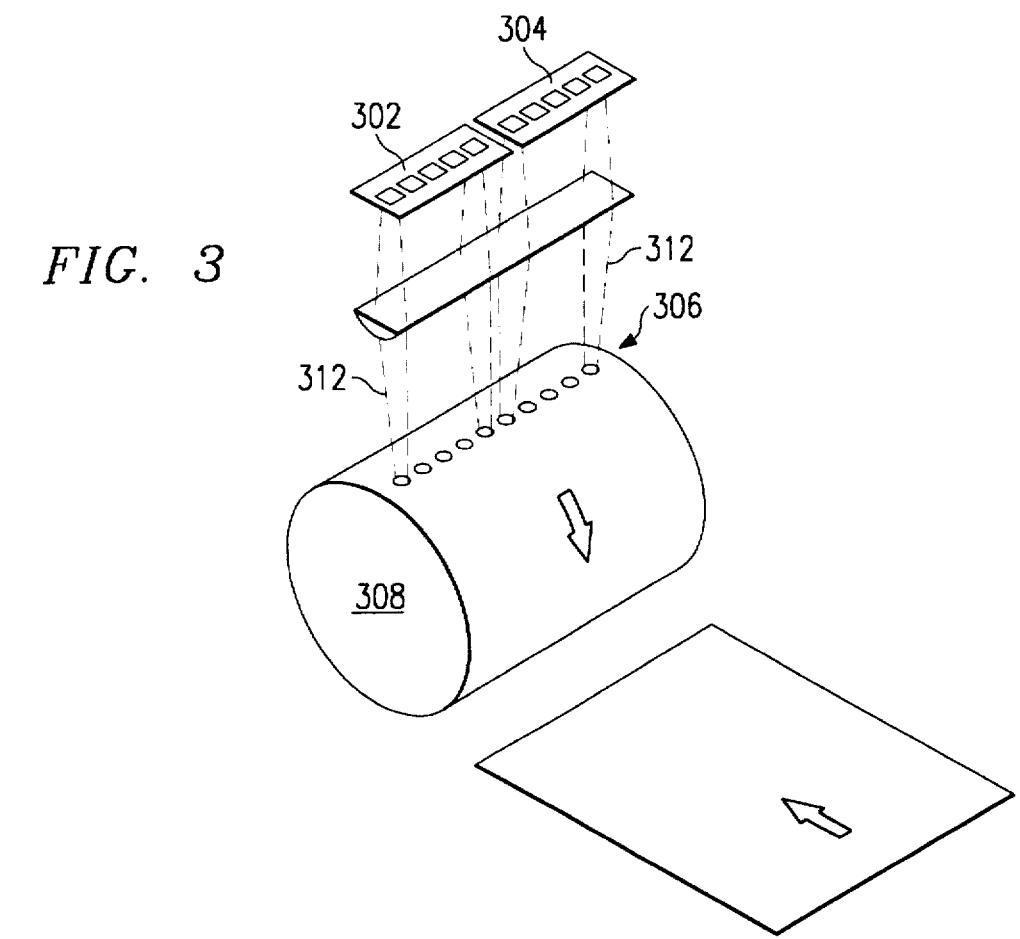
FIG. 3 is a pictorial view of two prior art imaging devices illuminating a single scan row of an electrostatic printer drum.

As discussed earlier, it is sometimes impractical to build a single imaging device array 200 that is large enough to expose an entire row of pixels 206. As shown in FIG. 3, two or more smaller arrays 302, 304 may be used in place of the single large array 200 of FIG. 2. If two arrays 302, 304 are used, part of an image is printed by one array 302, and a second part of the image is printed by a second array 304. As discussed earlier, the output image is comprised of a two-dimensional array of pixels, or a pixel grid. Each pixel in a row of the pixel grid is evenly spaced from each adjacent pixel in the row. Likewise, each row of pixels is evenly spaced from adjacent rows of pixels. The actual spacing depends on the pixel size, the resolution of the display, and the desired fill factor of the output image.

Figure 4:
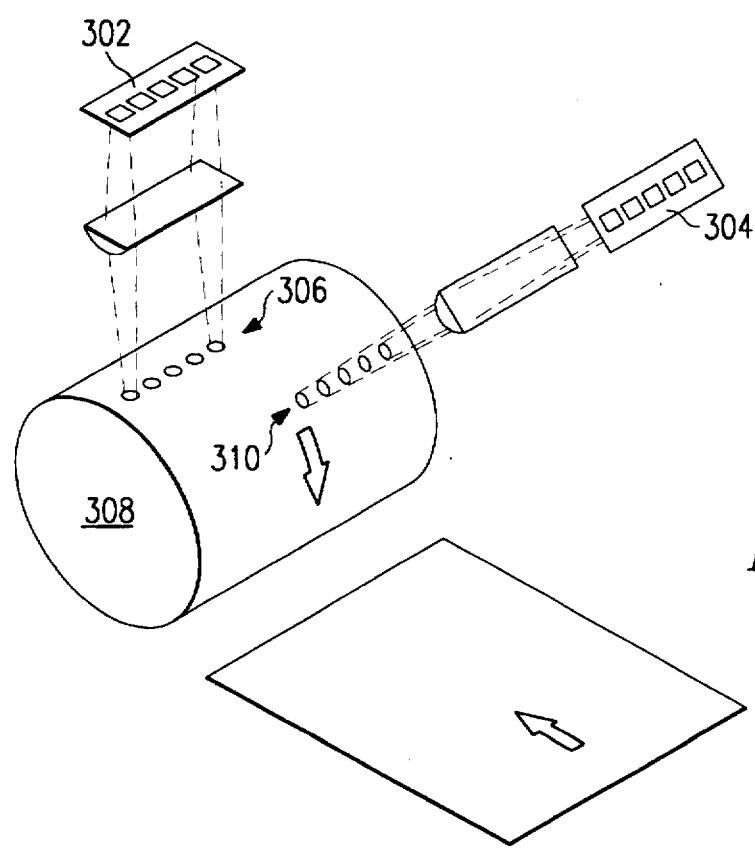
FIG. 4 is a pictorial view of two prior art imaging devices illuminating portions of two scan rows of an electrostatic printer drum.

The two imaging device arrays 302, 304 may be positioned, as shown in FIG. 3, such that they both image the same scan line 306, or the second array 304 may be separated, or offset, in the process direction from the first array 302 as shown in FIG. 4. If the two arrays 302, 304 are offset in the process direction, optics are used to either direct the output from both arrays 302, 304 onto the same scan line 306 on the drum 308, or a second scan line 310. If the two arrays 302, 304 image different scan lines, the image data applied to the first imaging device 302 is delayed relative to the data applied to the second imaging device 304 by the time required to rotate the drum 308 from the first scan line 306 to the second scan line 310. The delay ensures that the output of the two imaging devices 302, 304 will expose the same row of image pixels. Regardless of any offset in the process direction between the two imaging device arrays 302, 304, the output from the two arrays 302, 304 is abutted on a single scan line.

Any misalignment of the two imaging devices 302, 304 in either the scan or process directions will alter the uniform spacing of the pixel grid and result in a "seam" in the process direction at a point of transition between the output of a first imaging device 302 and the output of a second imaging device 304. Because the human eye tends to easily detect vertical or horizontal artifacts, the seam in the process direction, which may be either vertical or horizontal, but for the purposes of this discussion will be assumed to be horizontal, may be very noticeable, especially in text and graphic information where high contrast fonts or line information is being reproduced.

Figure 5:
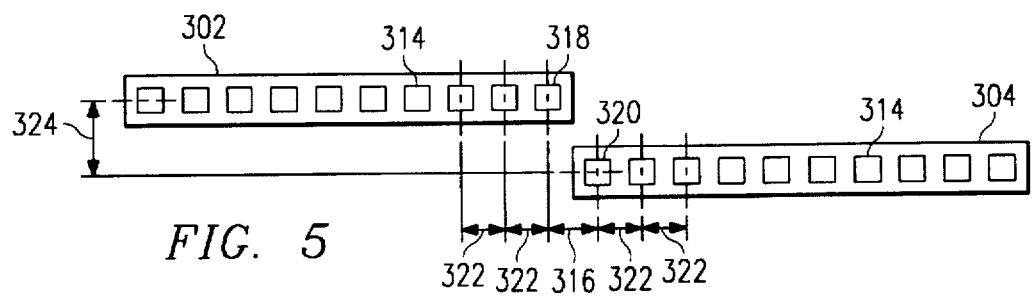
FIG. 5 is a plan view of two prior art imaging devices, as shown in FIGS. 3 and 4, showing misalignment in a scan direction.

FIG. 5 shows two imaging device arrays 302, 304, each having ten elements 314. The two imaging device arrays 302, 304 are misaligned causing the distance 316, in the scan direction, between the right-most element 318 of the first imaging device array 302 and the left-most element 320 of the second imaging device array 304 to be only 0.75 of the unit spacing 322 between all other elements 314 in the row. Although not shown in FIG. 5, the two imaging device arrays 302, 304 could also be misaligned in the process direction. That is, the spacing 324, in the process direction, between the output of the two imaging device arrays 302, 304 is not equal to the data delay between the two imaging devices 302, 304.

Figure 6:
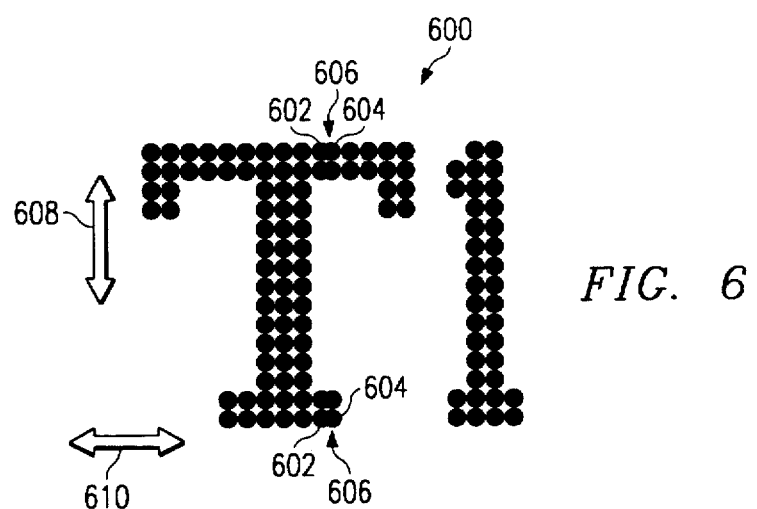
FIG. 6 is a view of a portion of text produced by the misaligned imaging devices of FIG. 5.

FIG. 6 shows text 600 printed by the misaligned imaging device arrays 302, 304 of FIG. 5. In FIG. 6, the spacing between the tenth pixel 602 and the eleventh pixel 604 in each row is only 0.75 times the spacing between each other pair of adjacent pixels. This causes a vertical artifact to appear in the text in the area 606 between the tenth 602 and eleventh 604 pixels. While this artifact may not be too objectionable when a single line of text is printed, when many lines of text are printed on a single page the lines tend to reinforce the artifact making it more noticeable. In addition to simply causing the pixels to be too close, inadequate spacing in electrostatic printers causes an increase in toner use as the toner tends to "clump up" between two closely spaced pixels. The additional toner may cause the two pixels to blend into one large pixel and further exacerbate the artifact caused by misalignment. The opposite effect occurs when the two imaging device arrays 302, 304 are spaced too far apart. Misalignment in the process direction (not shown) has a similar effect. Furthermore, misalignment in the process direction 608 causes distortion in lines that are parallel to the scan direction 610.

Figure 7:
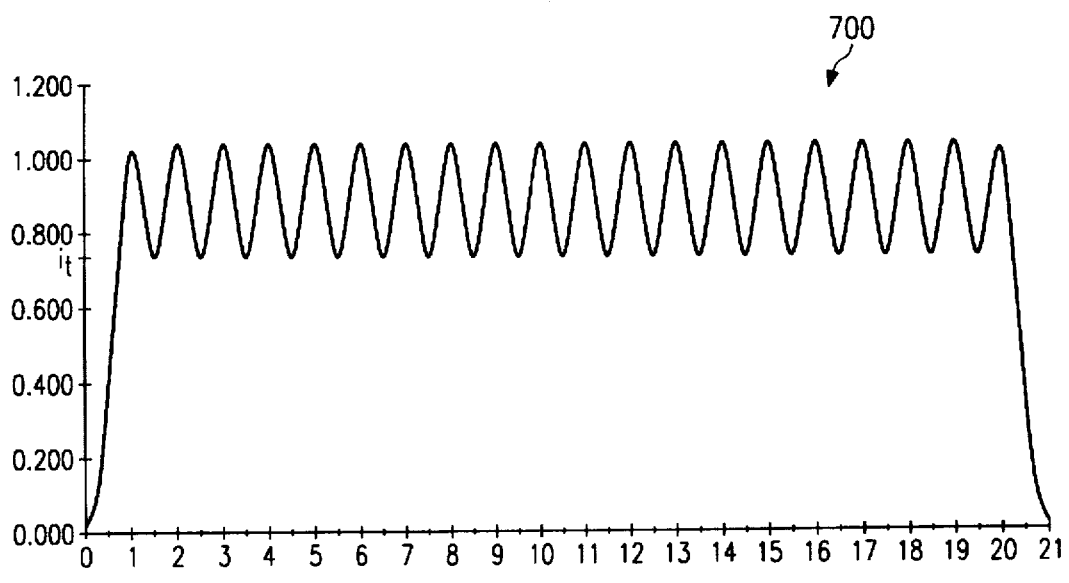
FIG. 7 is a plot of the intensity distribution of light projected onto an electrostatic printer drum across a single scan row by the imaging devices of FIGS. 2, 3, or 4.

Referring back to FIG. 3, as light 312 is imaged onto the drum, the intensity of the light from each imaging device element 314 typically has a Gaussian distribution pattern. The intensity distribution 700 for a row of twenty pixels is shown in FIG. 7. FIG. 7 plots the position of each pixel in the scan direction on the horizontal axis and the light intensity on the vertical axis. FIG. 7 is the ideal or desired intensity distribution output for a twenty-element segment of either a single light imaging device or multiple abutted light imaging devices 302, 304. It is important to note that the intensity distribution shown in FIG. 7 is a cross-section along a row of pixels in the scan direction. The actual light distribution from each pixel is Gaussian in both the process and scan directions resulting in light with a cone shaped intensity distribution being projected onto the drum 308 by each imaging device element 314.

Figure 8:
FIG. 8 is a view of a single row of dots printed by the exposure shown in FIG. 3.

FIG. 8 shows a row 800 of dots 802 that would be imaged on the drum 308 by light having the distribution shown in FIG. 7. The dots shown in FIG. 8 represent the areas of the photosensitive drum that are discharged by exposure to light. As discussed above, the discharged areas do not attract toner and therefore do not result In a dot being printed on the paper output of the printer. However, to illustrate the utility of the disclosed invention, the exposed dots will be shown as a shaded area and the unexposed regions surrounding the dots will he left blank. In FIG. 8, the photosensitive drum 308 is assumed to have a very abrupt transition, or intensity threshold, from electrically insulative to electrically conductive. All areas with an exposure greater than the intensity threshold, shown as i, in FIG. 7, are shown as a dark area and areas with an exposure of less than i, are shown as light areas. Although the dots 802 are shown in FIG. 8 as having a uniform intensity, the transition of the photosensitive drum 308 from electrically insulative to electrically conductive is typically more gradual such that the centers of the dots 802 are typically darker than the edges. Some light from each imaging device element 314 reaches the regions surrounding the imaged pixel and partially exposes the region occupied by adjacent dots 802. This reinforcement effect causes the dots 802 printed on the interior of a single row 800 to appear elliptical in contrast with dots 802 at each end of row 800 which appear egg-shaped. A single dot will appear circular if it is located too far away from any other dots to receive reinforcement.

Figure 9:
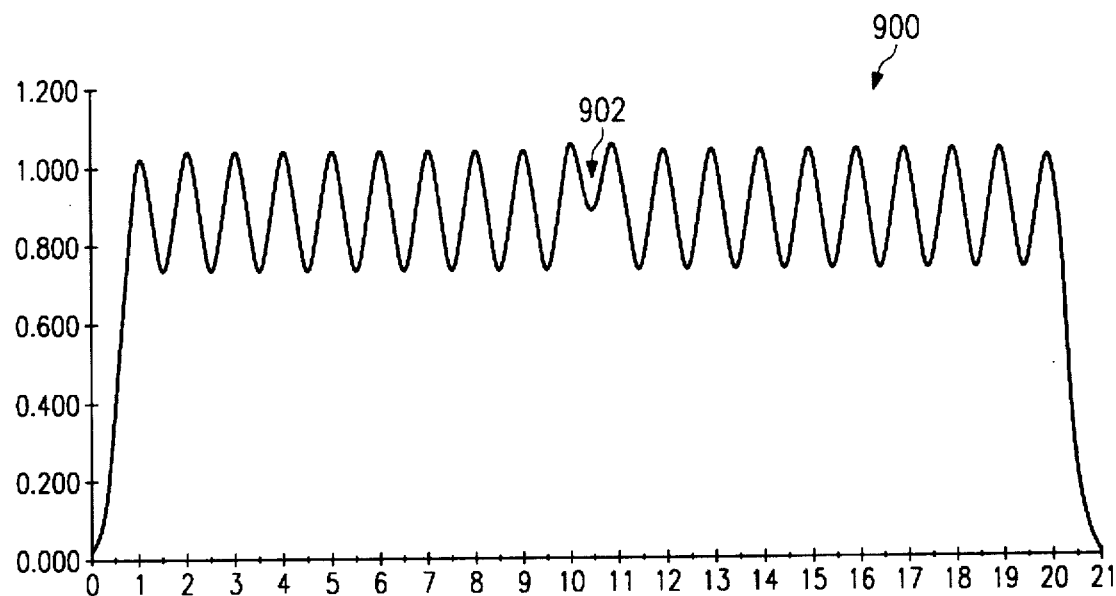
FIG. 9 is a plot of the intensity distribution of light projected onto an electrostatic printer drum across a single scan row by the two abutted ten-element imaging devices of FIGS. 3 and 4 that are spaced apart 10% less than the ideal spacing.
Figure 10:
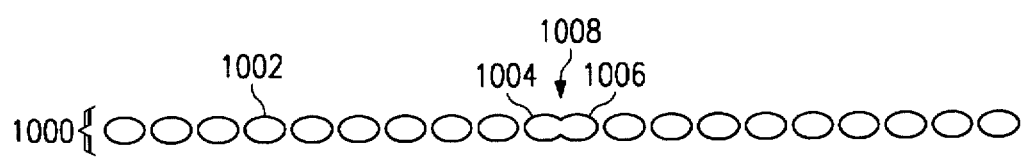
FIG. 10 is a view of a single row of dots printed by the exposure shown in FIG. 9.

FIG. 9 shows the intensity distribution 900 for light from two ten-element abutted arrays 302, 304 that are misaligned in the scan direction. In this case, the spacing between the tenth and eleventh pixels in the row is 10% less than the spacing between other adjacent pixels. The area between the middle two pixels 902 is reduced and receives more light from the adjacent arrays. FIG. 10 shows the line 1000 of dots 1002 that would be printed by the exposure of FIG. 9. As can be seen, the dots 1004, 1006 printed on either side of the seam 1008 between the two imaging device arrays 302, 304 are larger than the other dots and blend together to form one dot. If the two imaging device arrays 302, 304 had been too far apart, there would have been an abnormally large gap between the middle two dots 1004, 1006 and the middle two dots 1004, 1006 would have been smaller due to a reduction in the reinforcement from adjacent elements on the abutted imaging device array.

Figure 11:
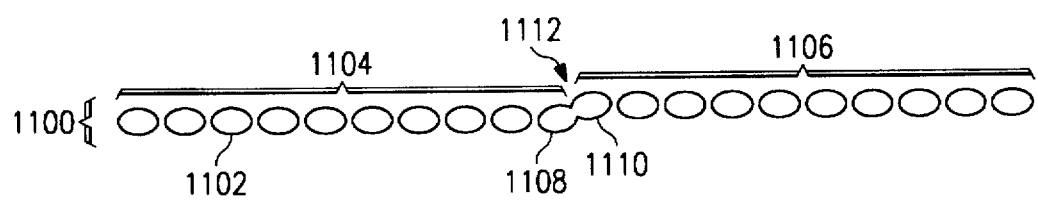
FIG. 11 is a view of a single row of dots printed by the two ten-element abutted arrays of FIGS. 3 and 4 that are misaligned in both a process and a scan direction.

Although intensity distribution 900 only included misalignment in the scan direction, the same effect occurs when the two arrays are misaligned in the process direction. FIG. 11 shows a row 1100 of dots 1102 that have been printed by two abutted arrays 302, 304 that are misaligned in both the scan and process directions. Any misalignment in the process direction not only results in the two halves 1104, 1106 of the row 1000 being misaligned, but also reduces the size of the dots 1108, 1110 nearest the seam 1112 because of the reduction of reinforcement between the elements 314 of the imaging device arrays 302, 304.

Figure 12:
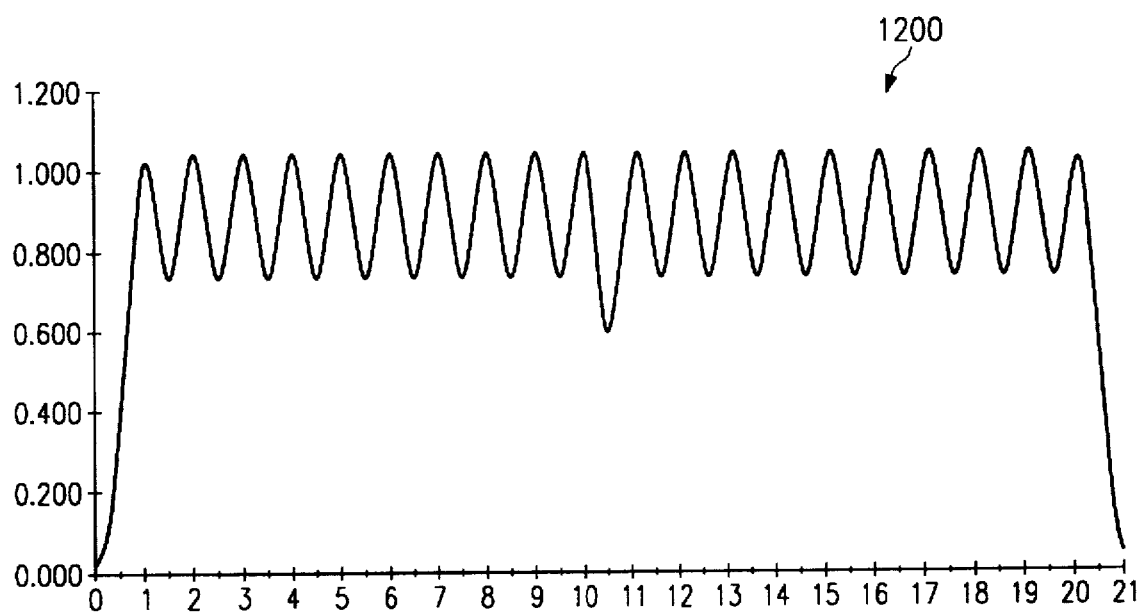
FIG. 12 is a plot of the intensity distribution of light projected onto an electrostatic printer drum across a single scan row by the two abutted ten-element imaging device arrays of FIGS. 3 and 4 that are spaced apart 10% more than the ideal spacing.
Figure 13:
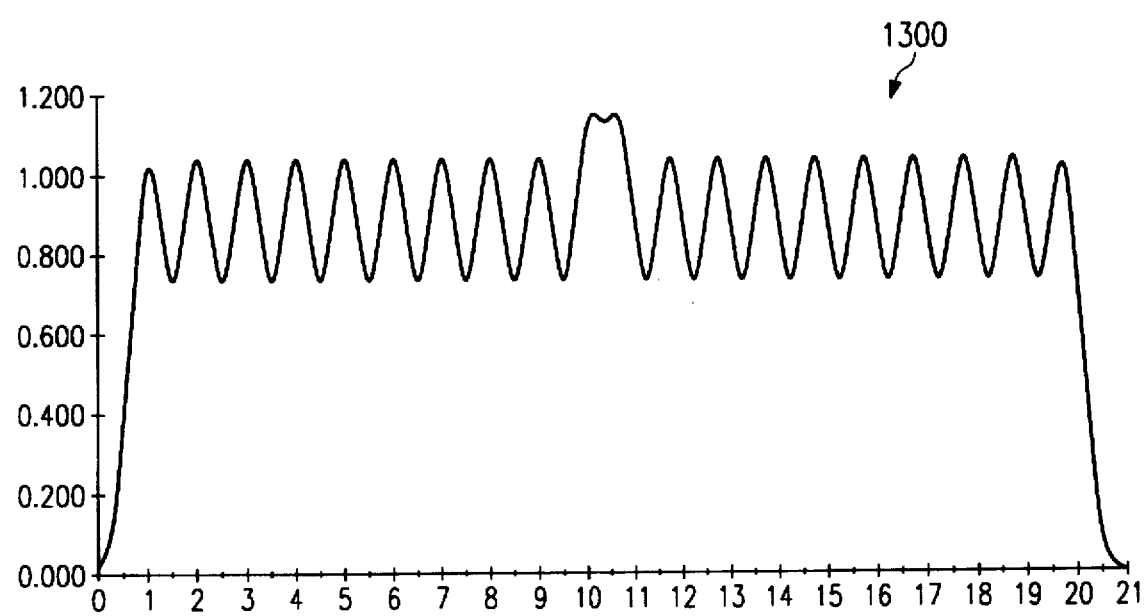
FIG. 13 is a plot of the intensity distribution of light projected onto an electrostatic printer drum across a single scan row by the two abutted ten-element imaging device arrays of FIGS. 3 and 4 that are spaced apart 25% less than the ideal spacing.
Figure 14:
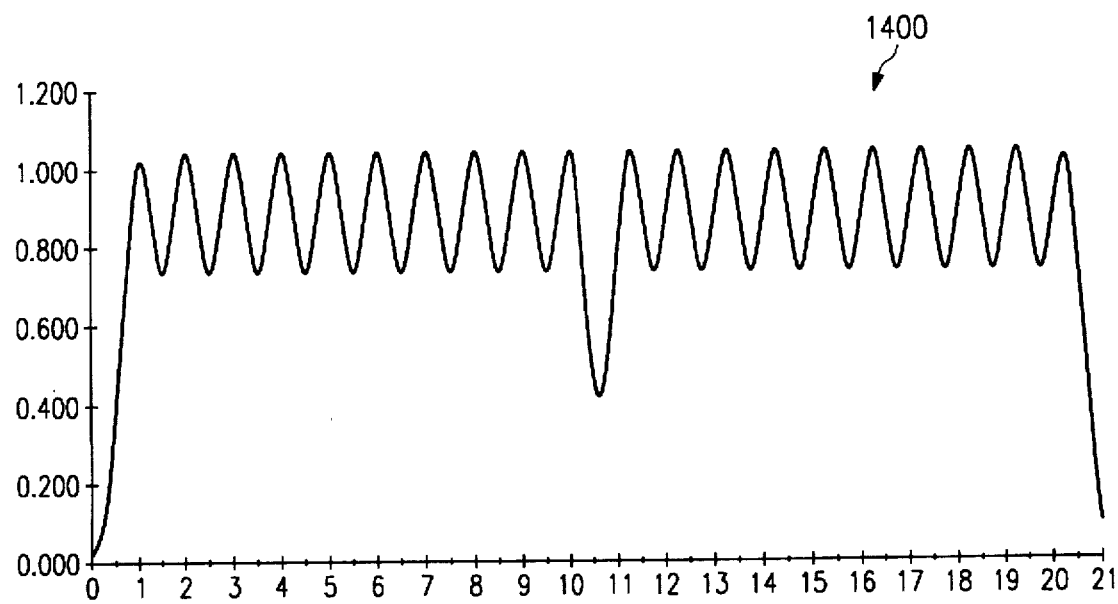
FIG. 14 is a plot of the intensity distribution of light projected onto an electrostatic printer drum across a single scan row by the two abutted ten-element imaging device arrays of FIGS. 3 and 4 that are spaced apart 25% more than the ideal spacing.
Figure 15:
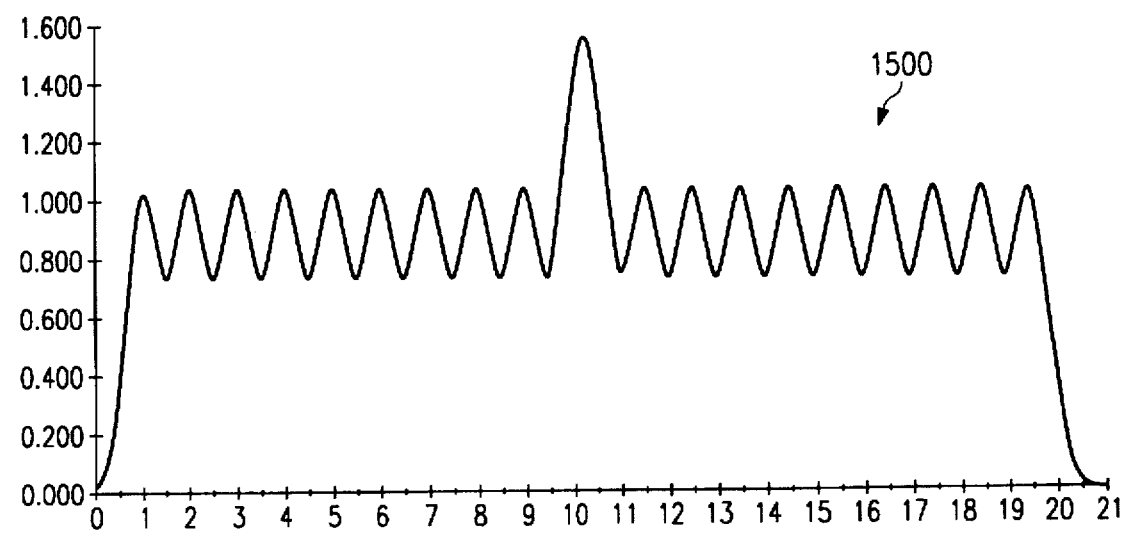
FIG. 15 is a plot of the intensity distribution of light projected onto an electrostatic printer drum across a single scan row by the two abutted ten-element imaging device arrays of FIGS. 3 and 4 that are spaced apart 50% less than the ideal spacing.
Figure 16:
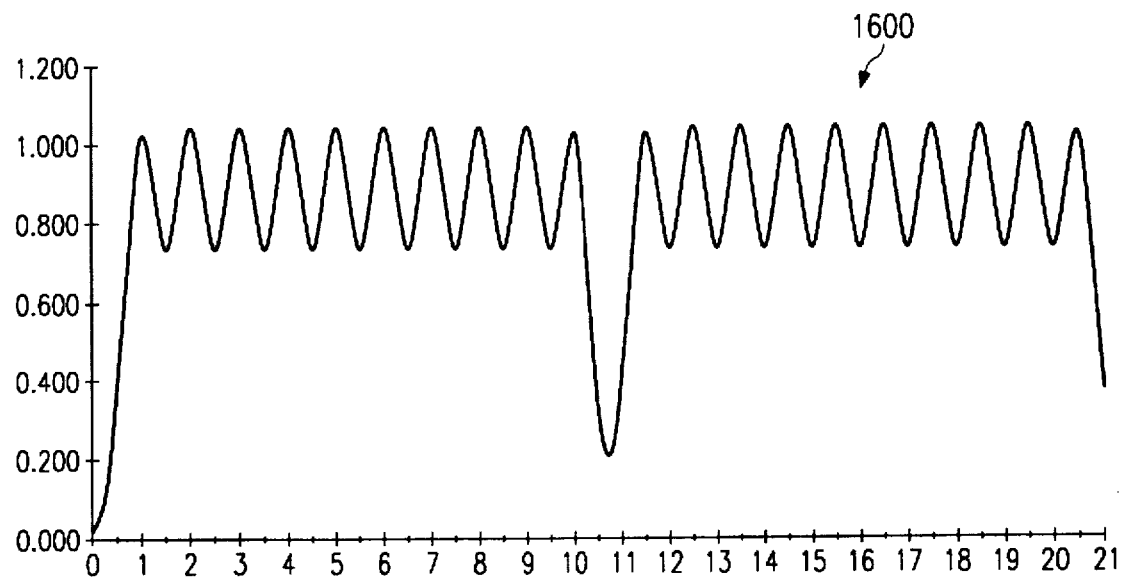
FIG. 16 is a plot of the intensity distribution of light projected onto an electrostatic printer drum across a single scan row by the two abutted ten-element modulator arrays of FIGS. 3 and 4 that are spaced apart 50% more than the ideal spacing.

FIGS. 12 through 16 show the intensity distribution for abutted arrays 302, 304 that are misaligned in only the scan direction. FIG. 12 shows the intensity distribution 1200 when the arrays are 10% further apart than the ideal spacing. FIG. 13 shows the intensity distribution 1300 when the arrays are 25% closer together than the ideal spacing. FIG. 14 shows the intensity distribution 1400 when the arrays are 25% further apart than the ideal spacing. FIG. 15 shows the intensity distribution 1500 when the arrays are 50% closer together than the ideal spacing. FIG. 16 shows the intensity distribution 1600 when the arrays are 50% further apart than the ideal spacing.

Figure 17:
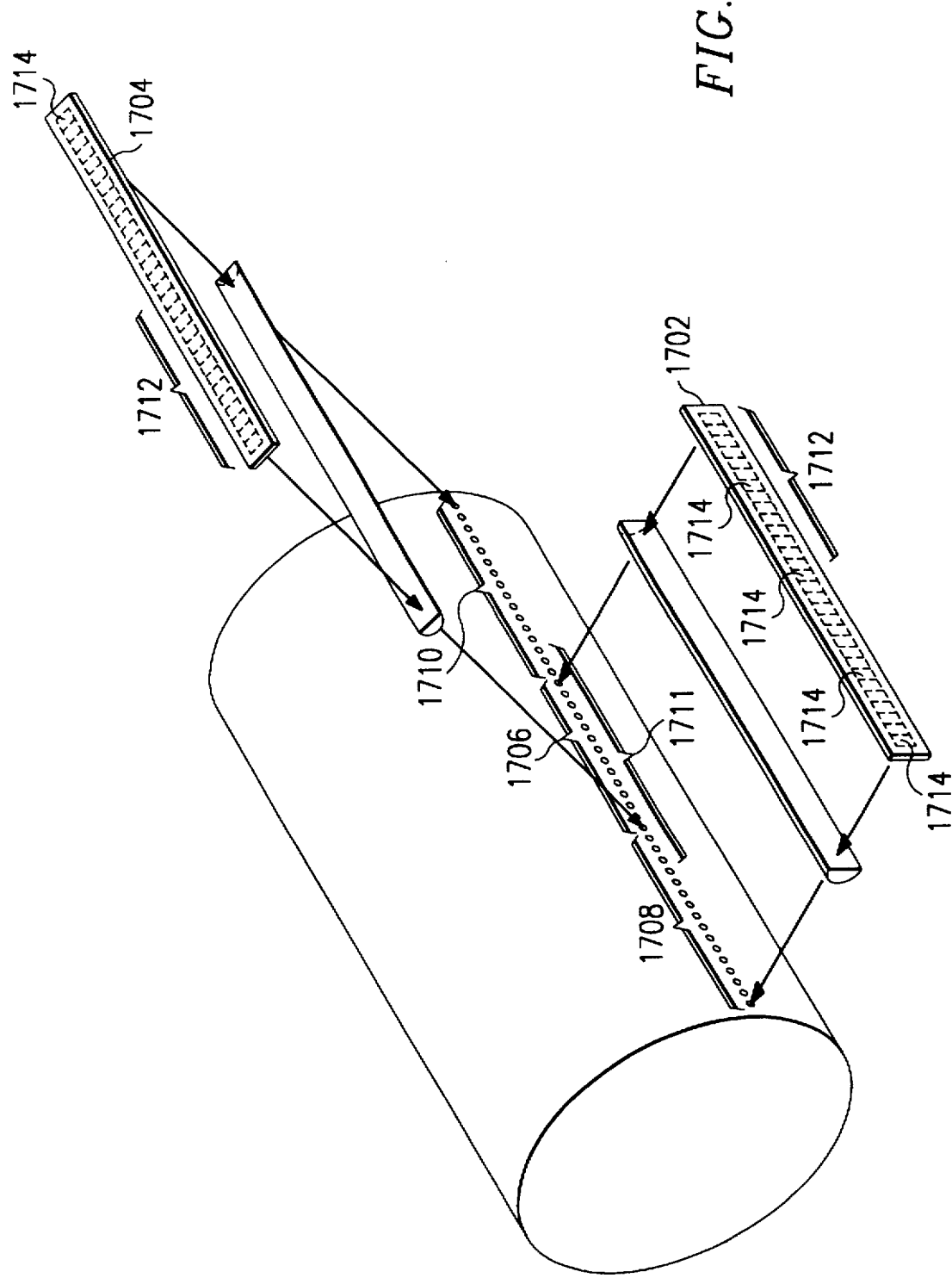
FIG. 17 is a pictorial view of two overlapping thirty-element modulator arrays used to image a twenty-pixel scan line according to the principles of the present invention.

Because even a very slight misalignment may be detected by the viewer, it is desirable to ameliorate the effects of misalignment without the effort and expense necessary to precisely align the imaging device 302, 304. One solution according to the present invention is to overlap a portion of the output of two imaging device arrays 302, 304 and to use both of the imaging device arrays 302, 304 to generate the portion of the display corresponding to the overlap. This solution requires increasing the number of imaging device elements 314 used to generate the image to avoid reducing the width of the display. Each imaging device array 302, 304 only supplies a part of the image intensity for the portion of the display where the two arrays 302, 304 collaborate. For example, the twenty-element region printed by two ten-element imaging device arrays in the prior example may be printed by a portion of two overlapped arrays 1702, 1704 as shown in FIG. 17. This allows the output of the imaging device arrays 1702, 1704 to overlap over a 14 pixel region 1706. Pixels to the left of the overlapped region 1708 are printed only by the left-most modulator array 1702, pixels in the overlapped region 1706 are printed by both devices, and pixels to the right of the overlapped region 1710 are printed by only the right-most imaging device array 1704. The two imaging device arrays 1702, 1704 shown in FIG. 17 are 30 elements long. Typical electrostatic printers systems may use imaging device arrays which are several hundred elements long while maintaining the 14-element overlap shown in FIG. 17. The disclosed invention will be discussed only in terms of the 20-element region 1711 centered about the 14-element overlap 1706.

In order for all of the pixels to receive the appropriate exposure, and therefore print a dot of the appropriate relative value, the intensity of the light from each of the overlapped elements 1712 is reduced. For example, if a four-bit binary intensity word is used to represent the desired intensity of each of pixel, there are sixteen levels of illumination. Assuming that 15 represents the maximum intensity value, a line of 20 maximum intensity pixels is illuminated by the two imaging device as shown below:

| Pixel Number | 1, | 2, | 3, | 4, | 5, | 6, | 7, | 8, | 9, | 10, | 11, | 12, | 13, | 14, | 15, | 16, | 17, | 18, | 19, | 20 |
|---|---|---|---|---|---|---|---|---|---|---|---|---|---|---|---|---|---|---|---|---|
| Intensity from Array 1702 | 15, | 15, | 15, | 14, | 13, | 12, | 11, | 10, | 9, | 8, | 7, | 6, | 5, | 4, | 3, | 2, | 1 | | | |
| Intensity from Array 1704 | | | | 1, | 2, | 3, | 4, | 5, | 6, | 7, | 8, | 9, | 10, | 11, | 12, | 13, | 14, | 15, | 15, | 15 |
| Total Intensity | 15, | 15, | 15, | 15, | 15, | 15, | 15, | 15, | 15, | 15, | 15, | 15, | 15, | 15, | 15, | 15, | 15, | 15, | 15, | 15 |

The position of pixels 4 through 17 is now a function of the positions of both imaging devices 1702, 1704 and the amount of light received from each. The center of any pixel is defined as the centroid of the light incident that pixel. The center of a pixel that receives equal light from both imaging device arrays 1702, 1704 is considered equal to the weighted average location of the illuminating imaging device elements. For example, the position of a pixel that receives light from both imaging device arrays 1702, 1704 may be determined by the following equation:

$$POSITION = ((N_1 \times P_1) + (N_2 \times P_2))/(N_1 + N_2)$$

where $N_1$ is the intensity received from the first imaging device array, $P_1$ is the position of the element in the first imaging device array, $N_2$ is the intensity received from the second imaging device array, and $P_2$ is the position of the element in the second imaging device array. In the above example, if the pixel positions across the scan line are defined relative to the position of the left-most element in imaging device array 1702, and imaging device array 1704 is 25% too close in the scan direction to modulator array 1702, the position of pixel 8 is equal to $((10 \times 8 + 5 \times 7.75)/15)$ =7.917. The location of each pixel in the scan row is shown in the Table below.

| PIXEL # | PIXEL LOC. | DIST. TO PRIOR PIXEL |
|---|---|---|
| 1 | 1 | — |
| 2 | 2 | 1 |
| 3 | 3 | 1 |
| 4 | 3.983 | .983 |
| 5 | 4.967 | .984 |
| 6 | 5.950 | .983 |
| 7 | 6.933 | .983 |
| 8 | 7.917 | .984 |
| 9 | 8.900 | .983 |
| 10 | 9.883 | .983 |
| 11 | 10.867 | .984 |
| 12 | 11.850 | .983 |
| 13 | 12.833 | .983 |
| 14 | 13.817 | .984 |
| 15 | 14.800 | .983 |
| 16 | 15.783 | .983 |
| 17 | 16.767 | .984 |
| 18 | 17.75 | .983 |
| 19 | 18.75 | 1 |
| 20 | 19.75 | 1 |

The algorithm used to divide the intensity between the two imaging device arrays 1702, 1704 in the above example linearly increases or decreases the intensity of a given imaging device array from one element to the next. This will have no effect on the image displayed if there is no misalignment. However, as shown in the column listing the distance to prior pixel in the above table, if misalignment exists the overlap has the effect of evenly distributing the effects of the misalignment over the entire overlapped area, pixels 4 through 17, thereby making visual detection of the misalignment error much more difficult. Because the overlapped region 1706 in the example shown includes such a large portion of the entire imaging device array, imaging device arrays do not appear to be significantly shortened. However, the same 14-element overlap may be used with arrays that are much longer resulting in a far greater decrease in the physical width of the imaging devices.

The effects of misalignment, or misalignment in the process direction, are ameliorated by exactly the same process. As the output from the two imaging device arrays 1702, 1704 are combined, the vertical position of each pixel in a row that is printed by two vertically misaligned imaging device arrays 1702, 1704 will gradually shift from the vertical position of the first imaging device 1702 to the vertical position of the second imaging device 1704.

Figure 18:
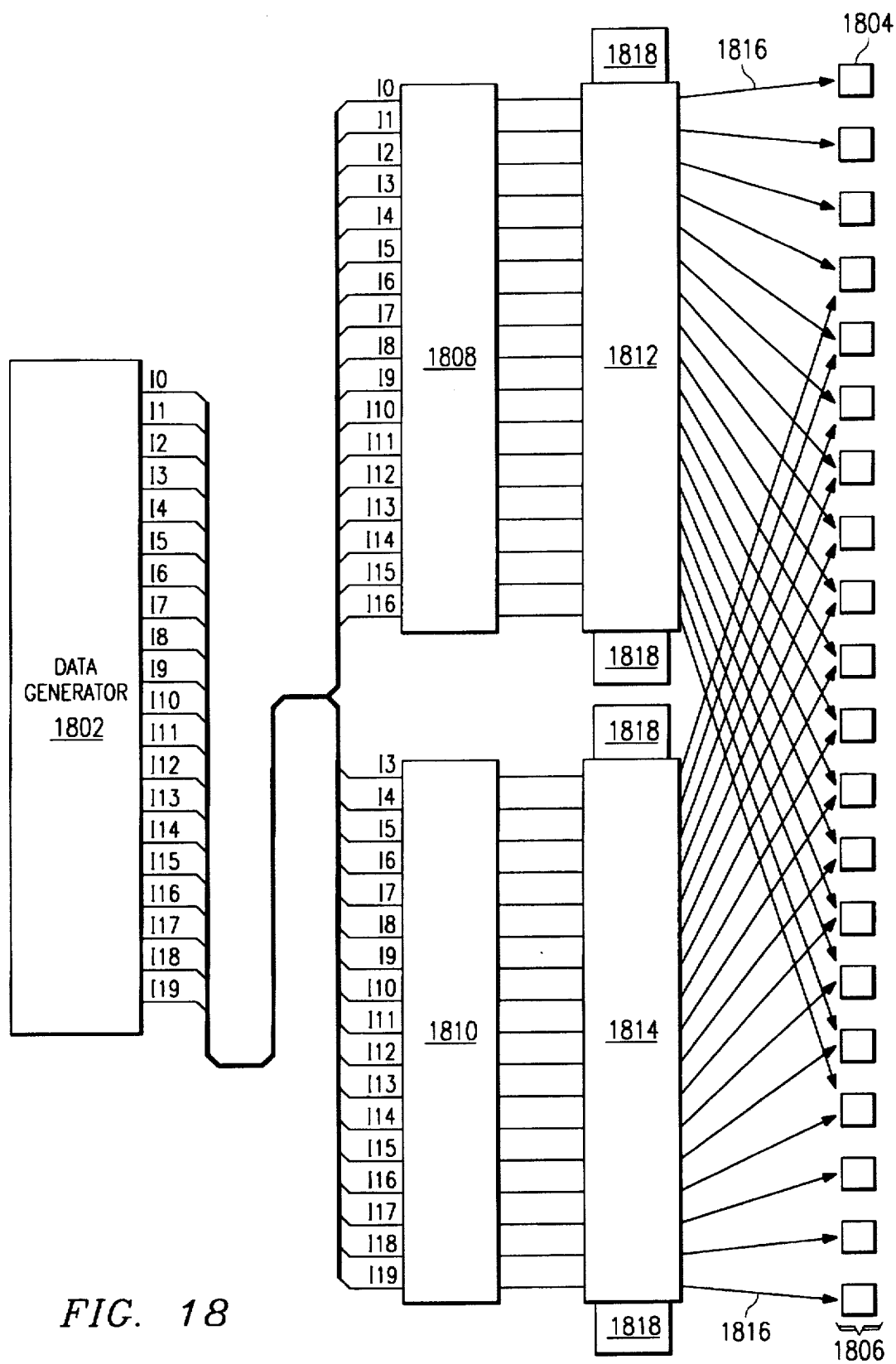
FIG. 18 is a schematic view of a control circuit used to control the two overlapping thirty-element modulator arrays of FIG. 17 according to the present invention.

FIG. 18 shows a schematic representation of an imaging device drive circuit 1800 according to the above embodiment. Data generator 1802 generates twenty intensity data words, 10 through 119, one for each pixel 1804 in a scan line 1806. The intensity data words are modified by adjustment facilities 1808, 1810 before being driven to the two imaging device arrays 1812, 1814 which are held in place by positioning facilities 1818. Adjustment facilities 1808, 1810 scale the intensity data words, 10 through 119, thereby implementing the algorithm shown above. While the adjustment facilities 1808, 1810 are shown as individual elements, they may be comprised of various forms of parallel or serial multipliers, look-up tables, or processors. The output 1816 from each element of the imaging device arrays 1812, 1814 is directed toward a single pixel 1804. However, depending on the location of the pixel 1804, the output 1816 from two imaging device array elements may be combined as input to a single pixel 1804.

Figure 19:
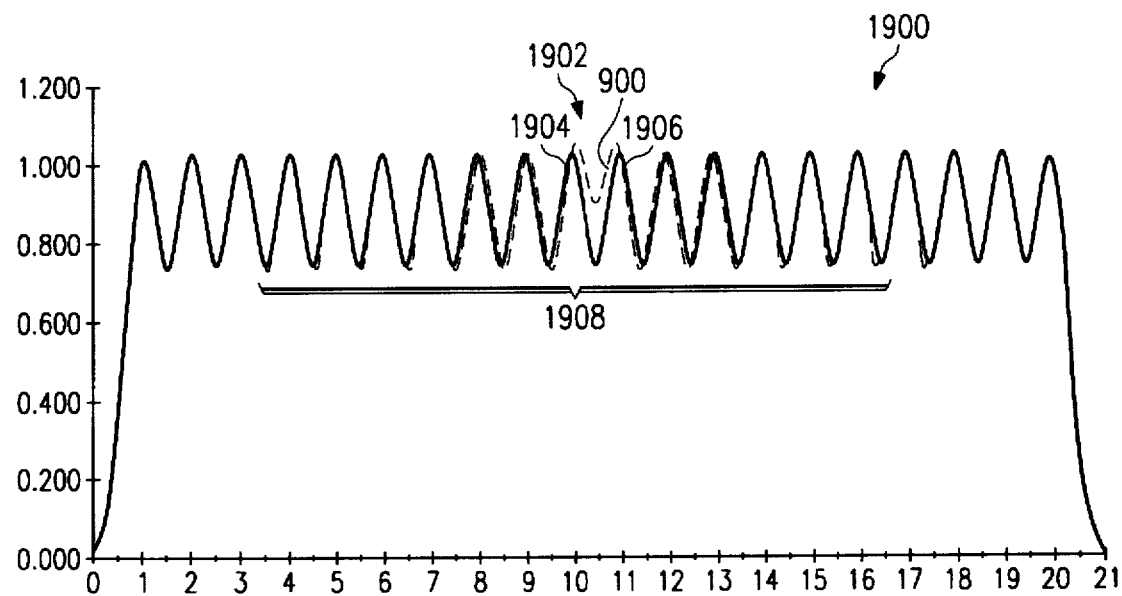
FIG. 19 is a plot of the intensity distribution of light protected onto an electrostatic printer drum across a single scan row by the two overlapping thirty-element imaging device arrays of FIG. 17 that are spaced apart 10% less than the ideal spacing and are used to cooperatively image a single twenty-pixel scan line according to the present invention.
Figure 20:
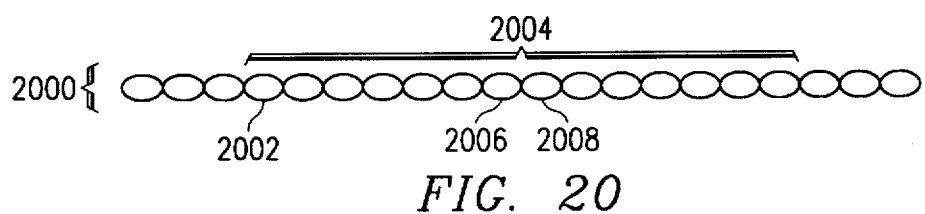
FIG. 20 is a view of a single row of dots printed by the exposure shown in FIG. 19.

FIG. 19 shows the intensity distribution 1900 generated over the 20-element region 1711 in which the two imaging device arrays 1702, 1704 overlap. In FIG. 19, the two imaging device arrays 1702, 1704 are spaced 10% too close to each other in the scan direction. The intensity distribution 900 from FIG. 9 is superimposed on distribution 1900 to show the effects for the overlap. There is no significant increase in the light intensity in the region 1902 between the middle two imaging device elements 1904, 1906. The intensity increase in the center region 902 of FIG. 9 has effectively been distributed along the entire overlap 1908. FIG. 20 shows the row 2000 of dots 2002 that is printed by the intensity distribution 1900 of FIG. 19. While there is some increase in the light intensity 1900 between the overlapped elements, as shown by the slight elongation of the dots 2004 of FIG. 20 as compared to FIG. 10, there is not the substantial blending of the two center dots 2006, 2008 as was shown in FIG. 10.

Figure 21:
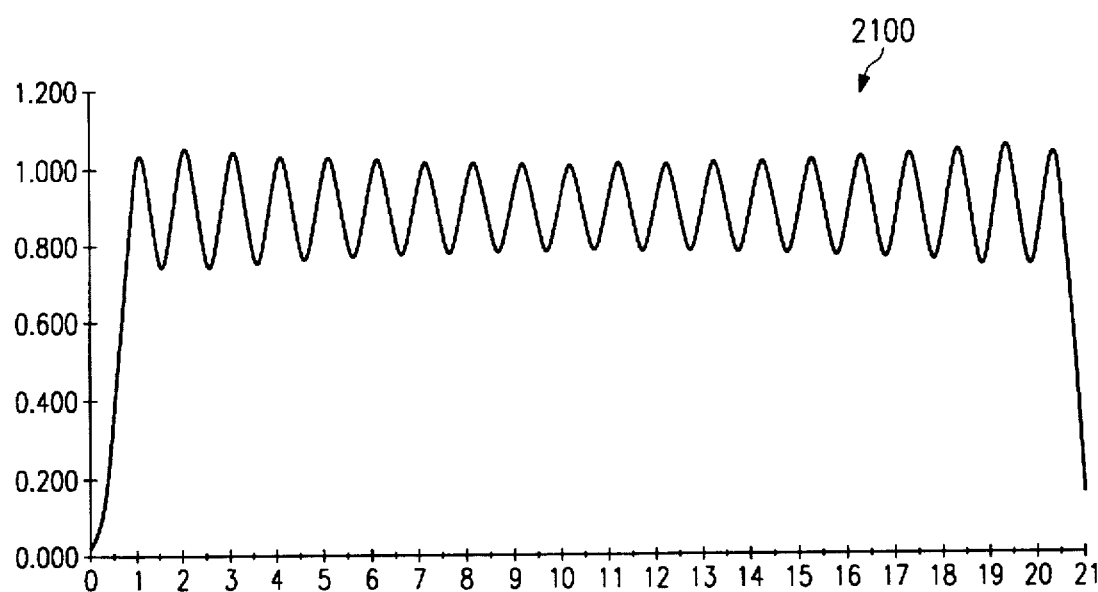
FIG. 21 is a plot of the intensity distribution of light projected onto an electrostatic printer drum across a single scan row by the two overlapping thirty-element imaging device arrays of FIG. 17 that are spaced apart 10% more than the ideal spacing and are used to cooperatively image a single twenty-pixel scan line according to the present invention.
Figure 22:
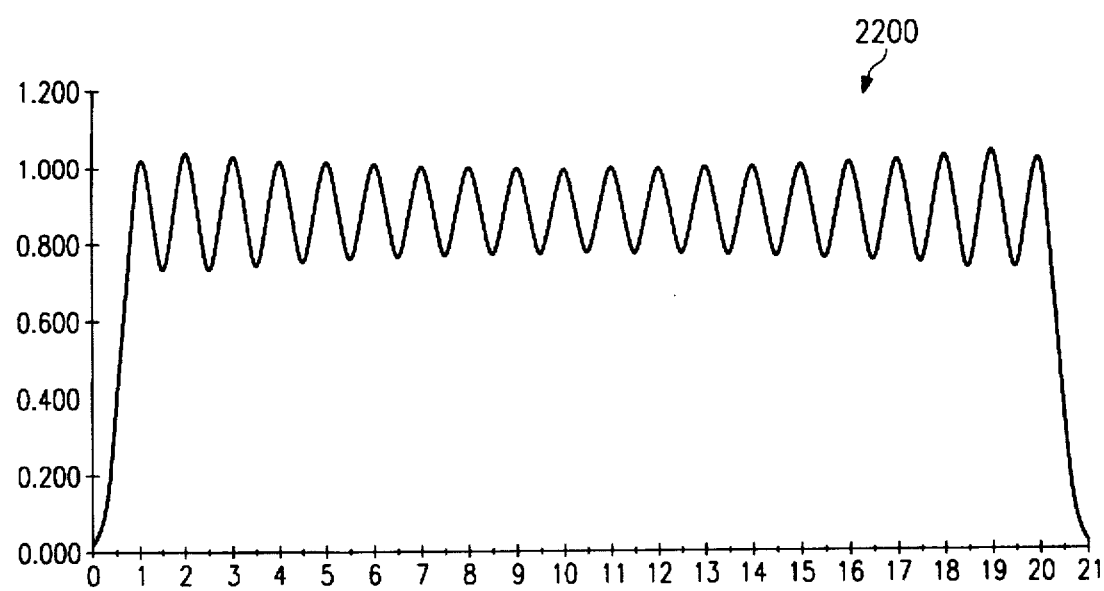
FIG. 22 is a plot of the intensity distribution of light projected onto an electrostatic printer drum across a single scan row by the two overlapping thirty-element imaging device arrays of FIG. 17 that are spaced apart 25% less than the ideal spacing and are used to cooperatively image a single twenty-pixel scan line according to the present invention.
Figure 23:
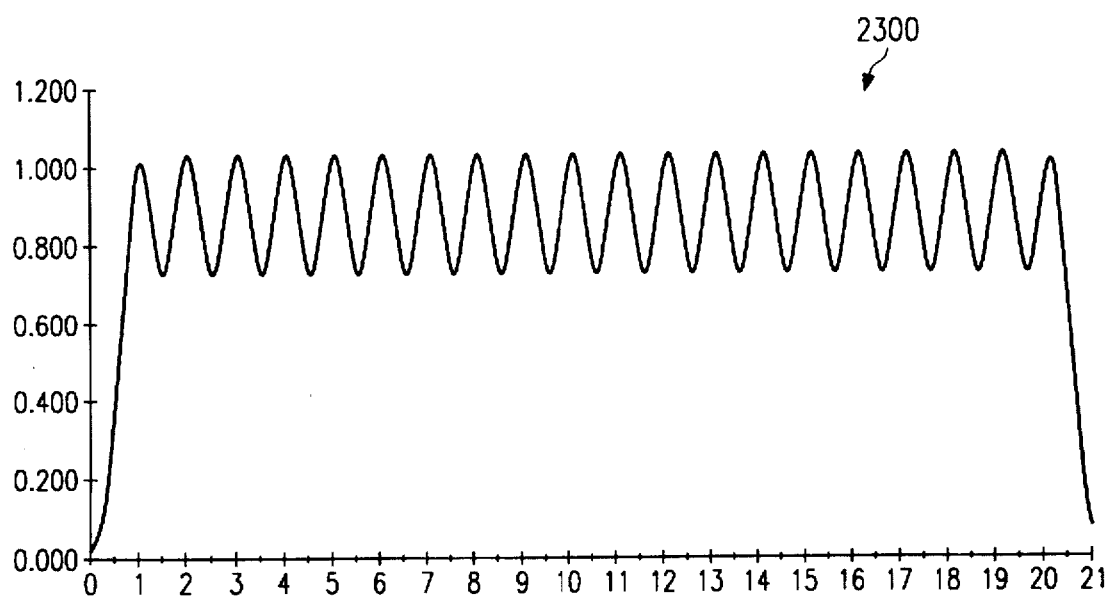
FIG. 23 is a plot of the intensity distribution of light projected onto an electrostatic printer drum across a single scan row by the two overlapping thirty-element imaging device arrays of FIG. 17 that are spaced apart 25% more than the ideal spacing and are used to cooperatively image a single twenty-pixel scan line according to the present invention.
Figure 24:
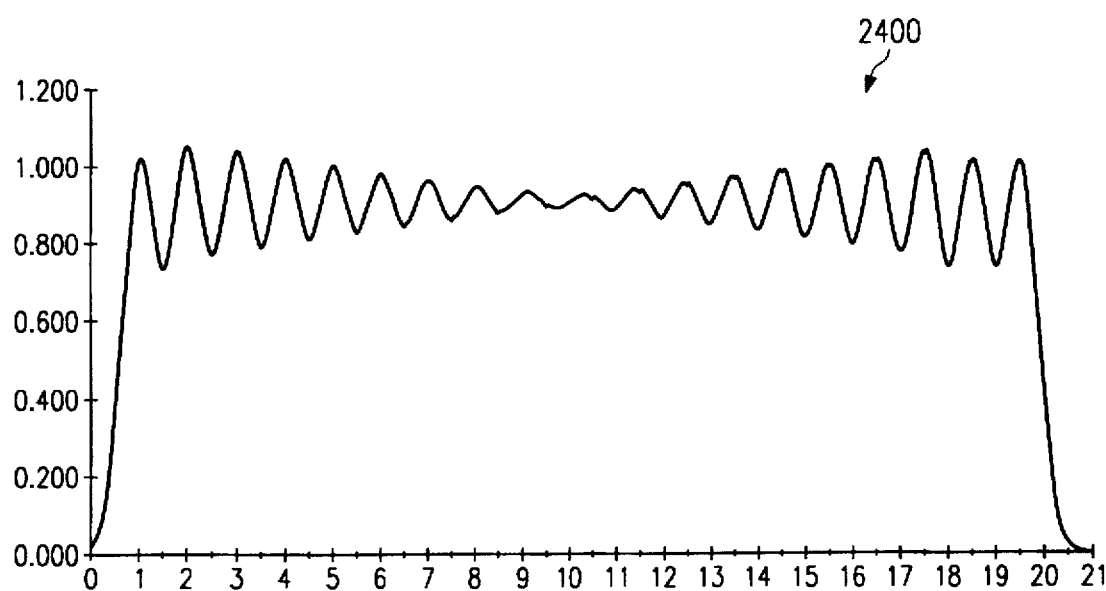
FIG. 24 is a plot of the intensity distribution of light projected onto an electrostatic printer drum across a single scan row by the two overlapping thirty-element imaging device arrays of FIG. 17 that are spaced apart 50% less than the ideal spacing and are used to cooperatively image a single twenty-pixel scan line according to the present invention.
Figure 25:
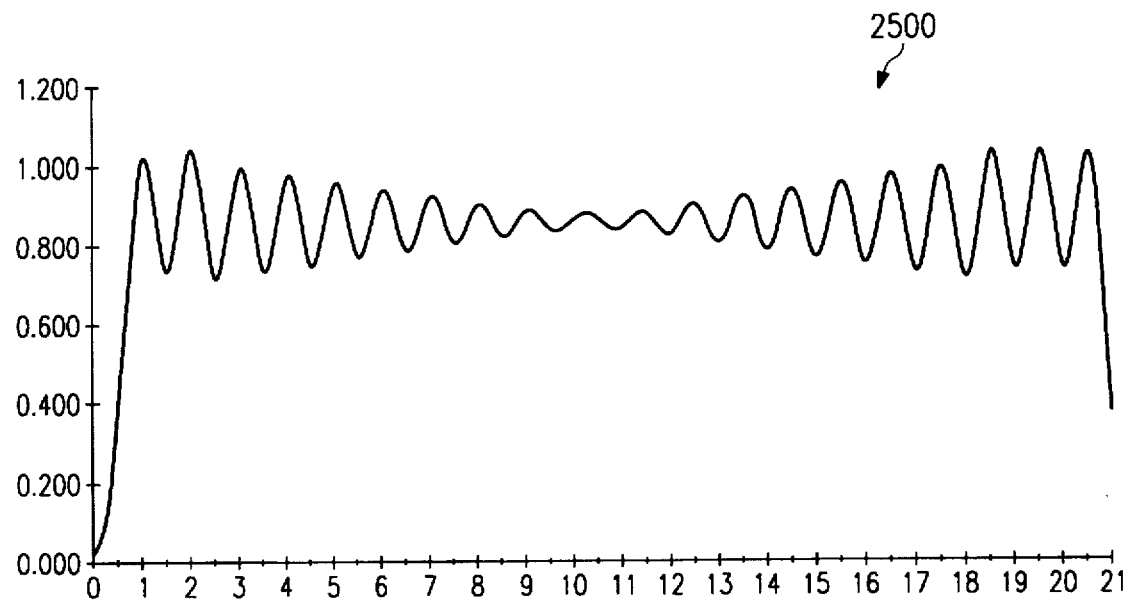
FIG. 25 Is a plot of the intensity distribution of light projected onto an electrostatic printer drum across a single scan row by the two overlapping thirty-element imaging device arrays of FIG. 17 that are spaced apart 50% more than the ideal spacing and are used to cooperatively image a single twenty-pixel scan line according to the present invention.

FIGS. 21 through 25 show the intensity distribution generated over the 20-element region 1711 in which the two imaging device arrays 1702, 1704 overlap. In FIGS. 21 through 25, the two imaging device arrays 1702, 1704 are misaligned in only the scan direction. FIG. 21 shows the intensity distribution 2100 when the arrays are 10% further apart than the ideal spacing. FIG. 22 shows the intensity distribution 2200 when the arrays are 25% closer together than the ideal spacing. FIG. 23 shows the intensity distribution 2300 when the arrays are 25% further apart than the ideal spacing. FIG. 24 shows the intensity distribution 2400 when the arrays are 50% closer together than the ideal spacing. FIG. 25 shows the intensity distribution 2500 when the arrays are 50% further apart than the ideal spacing.

Many algorithms may be used to divide the intensity between the two imaging device arrays 1702, 1704. Preferably, the algorithm used results in the displayed pixel intensity being equal to the desired intensity without large errors from rounding off the individual imaging device element 1714 intensities. One example of a valid algorithm that uses a more abrupt "stair-step" approach instead of the gradual linear transition between the two overlapped imaging device arrays 1702, 1704, results in the following distribution:

be increased so that the total intensity equals the desired intensity. Typically, the imaging device element 1714 with the lowest output intensity is increased.

There are numerous ways of varying the intensity output of a single imaging device element. As mentioned earlier, some sources are easily modulated to allow control of the output power. Some modulators, such as an LCD array or a DMD being used in an analog mode, are also variable and can be used to continuously vary the intensity of the light output. Purely digital modulators, such as a bistable torsion beam DMD as taught in commonly assigned U.S. Pat. No. 5,061,049, use duty cycle modulation to achieve the visual effect of an analog output. Two common methods of varying the duty cycle of a pulse are pulse-width modulation and the use of a variable number of constant length pulses.

When using multiple pulses of light to expose a single image pixel it is possible to use imaging device arrays that

| Pixel Number | P1, | P2, | P3, | P4, | P5, | P6, | P7, | P8, | P9, | P10, | P11, | P12, | P13, | P14, | P15, | P16, | P17, | P18, | P19, | P20 |
|---|---|---|---|---|---|---|---|---|---|---|---|---|---|---|---|---|---|---|---|---|
| Intensity from Array 1702 | 15, | 15, | 15, | 10, | 10, | 10, | 10, | 10, | 10, | 10, | 5, | 5, | 5, | 5, | 5, | 5, | 5, | | | |
| Intensity from Array 1704 | | | | 5, | 5, | 5, | 5, | 5, | 5, | 5, | 10, | 10, | 10, | 10, | 10, | 10, | 10, | 15, | 15, | 15 |
| Total Intensity | 15, | 15, | 15, | 15, | 15, | 15, | 15, | 15, | 15, | 15, | 15, | 15, | 15, | 15, | 15, | 15, | 15, | 15, | 15, | 15 |

The above distribution does not smoothly spread the alignment error over each gap between pixel 3 through pixel 18, but rather spreads the error between three gaps; between pixels 3 and 4, between pixels 10 and 11, and between pixels 17 and 18. Because the misalignment errors are not spread as evenly, the effects of misalignment may not be completely ameliorated.

The number of imaging device elements 1712 from the two imaging device arrays 1702, 1704 that overlap does not have to be fourteen. Any number of imaging device elements 1712 may overlap, a larger overlap increases the difficulty of visually detecting the misalignment while a smaller overlap requires fewer or smaller imaging device elements. For example, an overlap of one element 1714 may be used with one element from each device supplying half of the desired intensity to the cooperatively produced pixel. While an overlap of a single element 1714 helps reduce the effects of misalignment, a one element overlap only distributes the effects of any misalignment between two imaging device element gaps and the viewer may still detect the misalignment.

Figure 26:
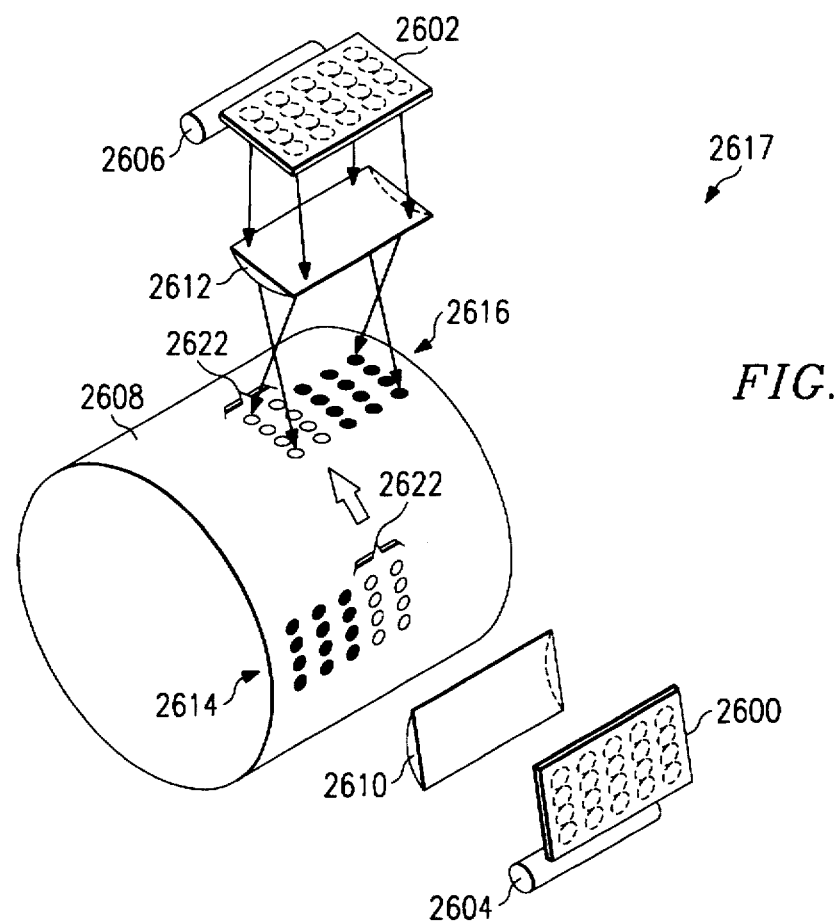
FIG. 26 is a pictorial view of two overlapping four-row imaging device arrays each used to image different portions of independent scan lines according to one embodiment of the present invention.

The examples shown thus far have assumed that it is desired to display an entire row of maximum intensity pixels. Other images, such as text or gray-scale images, require pixels to be illuminated at varying intensities including zero. To print a gray-scale intensity pixel, the intensity of each of the contributing imaging device elements is proportionally reduced. For example, in the first example above, if pixel 9 was desired to have an intensity of 10, or ⅔ of the maximum intensity, imaging device array 1702 may output an intensity value of 6 and modulator array 1704 may output an intensity value of 4, to yield 10 total pulses. The two contributing imaging device elements 1714 are not necessarily equally scaled, but the total intensity from the contributing imaging device elements 1714 should equal the desired intensity for the image pixel. Many of the gray-scale values cannot be divided evenly between the contributing imaging device elements 1714, in this case the intensity of any of the contributing imaging device elements 1714 may have multiple rows of imaging device elements. Typically, the light from each row of imaging device elements is focused onto the rotating drum on a separate scan row. FIG. 26 is a simplified perspective view of two imaging device arrays 2600, 2602, each having four rows of five elements. In FIG. 26, light from each light source 2604, 2606 is reflected from each of the two imaging device arrays 2600, 2602 and imaged onto the printer drum 2608 by lenses 2610, 2612 onto a separate set 2614, 2616 of tour scan lines. As the drum 2608 is rotated in the direction of arrow 2618, the imaging device elements 2620 on each successive row are activated. Because the activation of the imaging device elements 2620 and the rotation of the drum 2608 are synchronized, one element 2620 from each of the imaging device rows contributes to the time-integrated exposure of a single image pixel. In the embodiment shown in FIG. 21, there is a two-element overlap 2622 between the two imaging device arrays 2600, 2602 which allows an eight-element row to be printed. Typically, the row is much longer, however an eight-element row is adequate to illustrate the operation of the printer 2624. In order to print an image pixel located in the region which is overlapped by the two arrays 2600, 2602, the activation of each of the imaging device elements is synchronized with the rotation of the printer drum 2608 so that each imaging device element is activated as the pixel rotates past the image from the element. This allows each of the imaging device arrays 2600, 2602 to simultaneously image portions of four scan rows.

Figure 27:
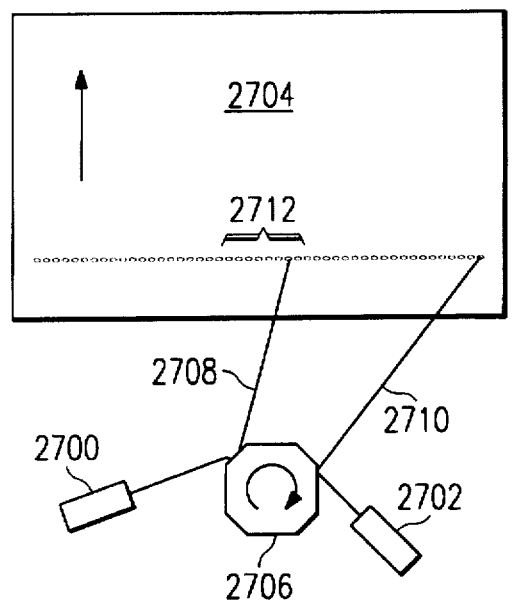
FIG. 27 is a plan view of two laser sources imaging portions of a scan row by reflection off of a single rotating scan mirror according to one embodiment of the present invention.

In addition to modulating the duty cycle in order to vary the light exposure of each image pixel, the light source intensity may also be modulated, typically on a row by row basis. Certain types of imaging devices, for example LED arrays, are more amenable to row by row source variations. For example, if each row of imaging device elements outputs twice the light of the preceding row, a binary gray-scale image could easily be generated by using one binary bit of the intensity data word to activate each row of the elements. Of course, the intensity data word for the overlapped regions would have to be proportionally reduced so that the resulting display intensity of the overlapped regions would be proportionate to the display intensity of the nonoverlapped regions. The imaging devices being aligned need not be arrays of individual elements. For example, typical laser printers use a single laser source and a spinning mirror to scan across a row. An embodiment of the present invention, shown in FIG. 27, could be used to allow the use of multiple laser sources 2700, 2702, or a single source and multiple light imaging devices, to simultaneously scan multiple laser beams 2708, 2710 across the photosensitive drum 2704. In the embodiment shown in FIG. 27, the two laser sources 2700, 2702 are reflecting of a shared spinning mirror 2706. As was taught in the previous embodiments of this invention, the intensity from each laser beam would be reduced when the beam is impinging an area 2712 of the drum 2704 that is imaged by multiple laser beams 2708, 2710 so that the resultant image has the desired uniform intensity across all portions of the image.

Figure 28:
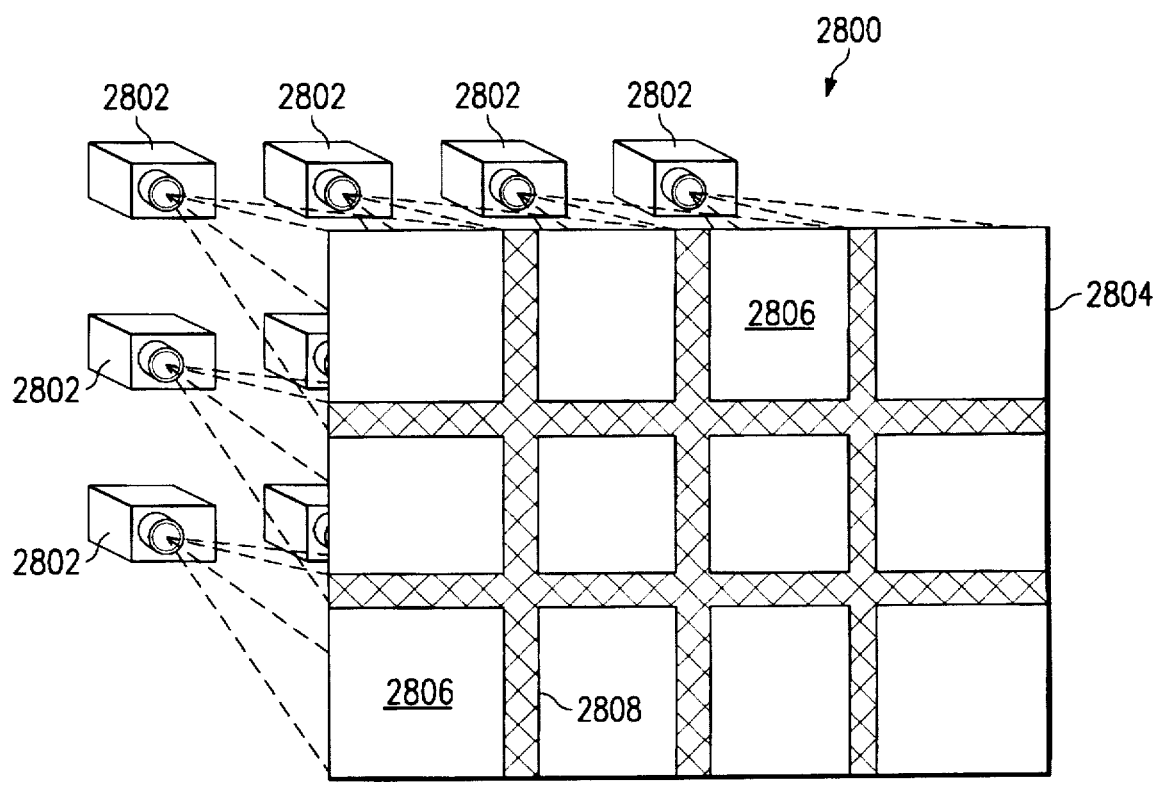
FIG. 28 is a pictorial view of a large screen image display using multiple image projection systems according to one embodiment of the present invention.

Although the embodiments of the invention discussed thus far have focused on printer systems, other embodiments are applicable to display systems. For example, if a very large screen projection display is desired, several smaller projection systems can be used in tandem to generate the display. One example of a video display system according to one embodiment of the present invention is shown in FIG. 28. In FIG. 28, a large screen display system 2800 is comprised of an array of projection systems 2802 that project an image onto the rear of a display screen 2804. The display projected onto the screen 2804 consists of areas 2806 which are imaged by only one system, and an area 2808 shown in cross-hatch which is imaged by two or more of the projection systems 2802. Each individual projection system 2302 merely reduces the intensity of the display projected onto the shared areas 2808 so that sum of all the projection systems 2802 serves to evenly illuminate the entire display. Thus, although there has been disclosed to this point a particular embodiment for a method of ameliorating the effects of misalignment in display arrays, and display systems incorporating the method, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art it is intended to cover all such modifications as fall within the scope of the appended claims.

What is claimed is:

1. An imaging system, comprising:

an image receptor surface for receiving light, said image receptor surface comprised of a row of pixels, each pixel for receiving a quantity of light proportional to an image signal corresponding to each pixel in said row;

at least two arrays, each said array comprised of at least two self-luminous imaging elements operable to produce a quantity of light in response to an input signal, each imaging element in each of said arrays corresponding to one pixel in said row and operable to illuminate only that pixel, said two arrays positioned relative to said row of pixels such that a first of said two arrays illuminates pixels in a first segment of said row and a second of said two arrays illuminates pixels in a second segment of said row, said first and said second segments overlapping to form three regions, a first region within said first segment illuminated solely by imaging elements in said first array, a second region in both said first and said second segments illuminated jointly by imaging elements in said first and said second arrays, and a third region within said second segment illuminated solely by imaging elements in said second array, each pixel in said second region located a distance from said first and said third regions; and said imaging elements in said first array contributing less to said quantity of light received by each said pixel in said second region as each said pixel in said second region is located farther from said first region, and said imaging elements in said second array contributing less to said quantity of light received by each said pixel in said second region as each said pixel in said second region is located farther from said third region, such that a sum of light illuminating each pixel in said second region from said first and said second arrays is proportional to said image signal corresponding to each pixel in said second region.

2. The imaging system of claim 1, said at least two arrays comprised of arrays of LED elements.

3. The imaging system of claim 1, further comprising a data generator for receiving said image signal for each pixel in said second region and for transmitting said input signal to said imaging elements in said first and said second arrays corresponding to said pixels in said second region.

4. The imaging system of claim 3, said data generator reducing said input signal to said imaging elements in said first array corresponding to each pixel in said second region based on said distance between said each pixel in said second region and pixels in said first region, and reducing said input signal to said imaging elements in said second array corresponding to each pixel in said second region based on said distance between said each pixel in said second region and pixels in said third region.

5. An imaging system, comprising:

an image receptor surface for receiving light, said image receptor surface comprised of a row of pixels, each pixel for receiving a quantity of light proportional to an image signal corresponding to each pixel in said row;

a light source for providing a beam of light for striking said image receptor surface;

at least two arrays, each said array comprised of at least two modulator elements operable to modulate light from said beam of light in response to an input signal, each modulator element in each of said arrays corresponding to one pixel in said row and operable to modulate light striking only that pixel, said two arrays positioned relative to said row of pixels such that a first of said two arrays modulates light striking only pixels in a first segment of said row and a second of said two arrays modulates light striking only pixels in a second segment of said row, said first and said second segments overlapping to form three regions, a first region within said first segment illuminated solely by modulator elements in said first array, a second region in both said first and said second segments illuminated jointly by modulator elements in said first and said second arrays, and a third region within said second segment illuminated solely by imaging device elements in said second array, each pixel in said second region located a distance from said first and said third regions; and said quantity of modulated light from each said modulating element corresponding to pixels in said second region is reduced such that a sum of light illuminating each pixel in said second region from said first and said second arrays is proportional to said image signal corresponding to each pixel in said second region, said modulator elements in said first array contributing less to said quantity of light received by each said pixel in said second region as each said pixels in said second region is located farther from said first region, and said modulator elements in said second array contributing less to said quantity of light received by each said pixel in said second region as each said pixels in said second region is located farther from said third region.

6. The imaging system of claim 5, said at least two arrays comprised of arrays of DMD light modulator elements.

7. The imaging system of claim 5, said at least two arrays comprised of arrays of LCD light modulator elements.

8. The imaging system of claim 5, further comprising a data generator for receiving said image signal for each pixel in said second region and for transmitting said input signal to said modulator elements in said first and said second arrays corresponding to said pixels in said second region, said data generator reducing said input signal to said modulator elements in said first array corresponding to each pixel in said second region based on the distance between said each pixel in said second region and pixels in said first region and said data generator reducing said input signal to said modulator elements in said second array corresponding to each pixel in said second region based on the distance between said each pixel in said second region and pixels in said third region.

9. A method of ameliorating the effects of misalignment between two or more arrays of imaging elements, said method comprising:

providing a first array of imaging elements, said first array of imaging elements positioned to illuminate a first segment of a row of pixels;

providing a second array of imaging elements, said second array of imaging elements positioned to illuminate a second segment of said row of pixels, said second segment overlapping said first segment to divide said row of pixels into three regions, a first region illuminated solely by said first array of imaging elements, a second region illuminated jointly by said first and said second arrays of imaging elements;

providing an image signal for each pixel in said row of pixels;

illuminating said row of pixels with a quantity of light corresponding to said image signal for each pixel, wherein said imaging elements illuminating said second region transmit less light to said pixels in said second region for a given image signal such that light from both said first and said second array of imaging elements transmitted to each pixel in said second region corresponds to said image signal for each pixel in said second region.

10. The method of claim 9, said illuminating step further comprising the step of reducing the light transmitted by said imaging elements in said first array to each pixel in said second region based on the distance between each said pixel and pixels in said first region.

11. The method of claim 9, said illuminating step further comprising the step of reducing the light transmitted by said imaging elements in said second array to each pixel in said second region based on the distance between each said pixel and pixels in said third region.

12. The method of claim 9, further comprising the step of:

providing a light source to generate a beam of light striking said first array of imaging elements and said second array of imaging elements;

said step of providing a first array of imaging elements comprising providing a first array of light imaging device elements; and said step of providing a second array of imaging elements comprising providing a second array of light modulator elements.

* * * * *

UNITED STATES PATENT AND TRADEMARK OFFICE
CERTIFICATE OF CORRRECTION

PATENT NO. : 5,757,411
DATED : May 26, 1998
INVENTOR(S) : James M. Florence It is certified that error appears in the above-identified patent and that said Letters Patent is hereby corrected as shown below:

TITLE PAGE, ADD THE FOLLOWING:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 5 2 6 0 7 1 8 | 11/09/93 | Rommelmann, et al. | | | |
| | 5 3 1 1 3 4 9 | 05/10/94 | Anderson, et al. | | | |

FOREIGN PATENT OR PUBLISHED FOREIGN PATENT APPLICATION

| | DOCUMENT NUMBER | PUBLICATION DATE | COUNTRY OR PATENT OFFICE | CLASS | SUBCLASS | TRANSLATION YES | NO |
|---|---|---|---|---|---|---|---|
| | 0 4 8 0 4 3 7 A 2 | 04/15/92 | Europe | | | | |
| | Abstract 01061269 | 08/03/89 | Japan | | | | |
| | 0 5 1 7 5 4 3 A 2 | 12/09/92 | Europe | | | | |
| | 0 5 5 6 5 9 1 A 1 | 08/25/93 | Europe | | | | |
| | GB 2 2 2 7 9 0 4 A | 08/08/90 | UK | | | | |

Signed and Sealed this

Twenty-sixth Day of October, 1999

Attest:

Q. TODD DICKINSON

*Attesting Officer*   Acting Commissioner of Patents and Trademarks